Oct. 30, 1962 G. J. NORD 3,060,842
EXTRACTION OF JUICE AND FABRICATION OF PRODUCTS FROM THE
LEAVES OF AGAVE LECHUGUILLA AND RELATED SPECIES
Filed Dec. 30, 1959 2 Sheets-Sheet 1
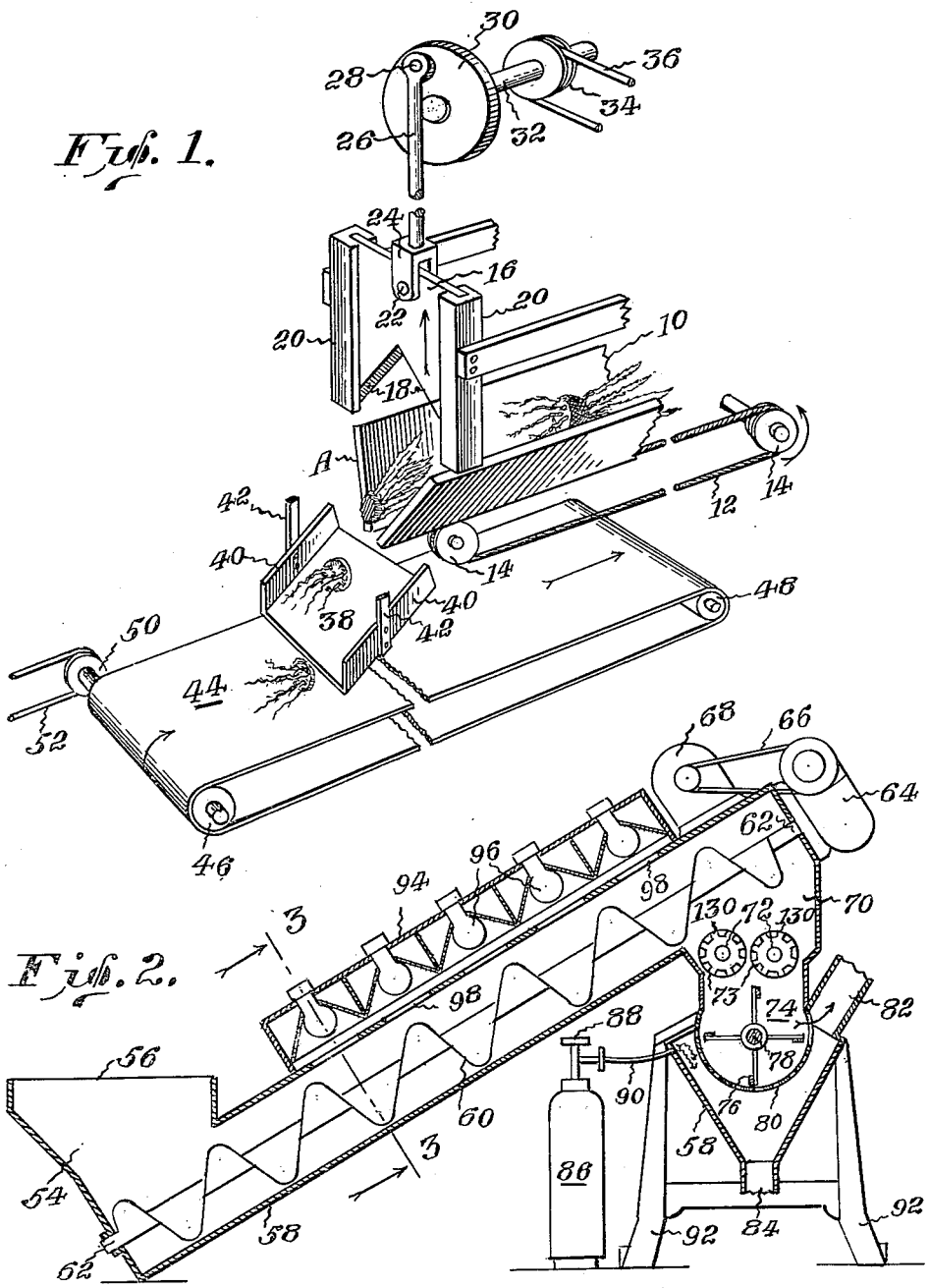
INVENTOR.
Gustav Jean Nord.
BY
Mason, Mason & Albright
Attorneys.

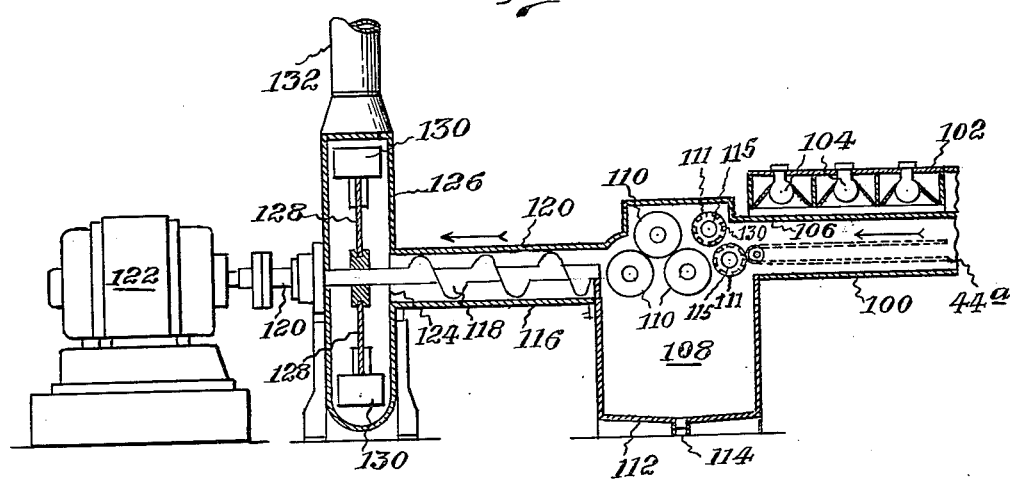
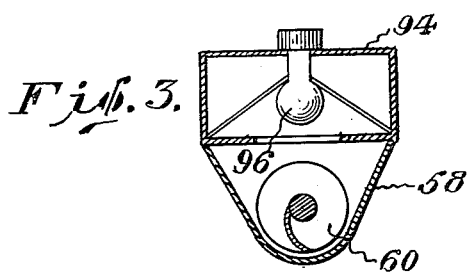
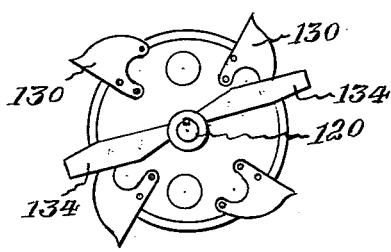

United States Patent Office 3,060,842
Patented Oct. 30, 1962

3,060,842
EXTRACTION OF JUICE AND FABRICATION OF PRODUCTS FROM THE LEAVES OF *AGAVE LECHUGUILLA* AND RELATED SPECIES
Gustav Jean Nord, 123 Norwood Ave., Asheville, N.C.
Filed Dec. 30, 1959, Ser. No. 863,029
2 Claims. (Cl. 100—37)

This invention relates to an improved process for the recovery of valuable extractive matter as formed in the juices of living plants of the amaryllis family such as *Agave lechuguilla* and kindred species variously known as amoles, yucca, century plants, maguey, henequen, *Agave sisalana*, etc. These plants, for the most part, grow wild and are most numerous, both in species and individuals in the arid and semi-arid parts of the southwestern states of the United States, Mexico, Central and South American countries which lie in the tropical and sub-tropical regions of this hemisphere.

Many of these species have been known for centuries as valuable sources for various medicaments, soap, fiber, cosmetics, paper, food and drink, and more recently they have attracted the attention of scientists in search for new and economical sources of raw material having medicinal potentials, particularly of a steroidal nature.

*Agave lechuguilla* may be taken as a typical and preferred member of the genus most appropriate for the purpose of this invention. It grows wild and in great abundance and thrives naturally on land practically worthless for other purposes. It is a hardy plant, resisting alike the dry and rainy seasons, and because of its shallow root system may be easily removed from the soil thereby greatly reducing the cost of harvesting as opposed to cutting the leaves from the plants in the field, which is the case with sisal, henequen, yucca, and the like. Moreover, the wild-growing *lechuguilla* plants have been found to contain a higher genin content than those grown under cultivation.

It is known that the extractive matter of vegetable products is formed in the plant juice of the living plant, and the juices from the *Agave lechuguilla* and its related species, therefore, constitute a valuable source of raw material capable of wide application, as, for example, in the synthesis of sex hormones from steroids which occur in the plant juice as glycosides; for the recovery of saponin and chlorophyll concentrates; for hair preparations, and in the cosmetic industry for use in skin creams and other compositions; for use in oil-drilling mud additives, detergents, and in the formulation of boiler water treating compounds. Additionally, its fiber, used either with or without its juice and pulpy constituents, may be used to form building elements such as blocks, pulpboard, etc.

Altogether, therefore, this plant and its related species fills a long felt want in these arts for the following reasons: it requires no cultivation; its abundance in arid and semi-arid regions; its ability to be harvested by unskilled labor; and in general the low cost factor of obtaining large amounts of its juice, pulp and fibers for various uses in the arts.

It is a primary object of this invention to process plants of the *Agave lechuguilla* and related species in such manner as to secure a maximum recovery of all of the above described products.

An additional object is to provide a process for the recovery of a very high yield of these plant juices in a relatively pure state, and to provide a process which is adaptable for recovering the raw juice or a combination of juice and fibrous constituents of these plants.

An additional object is to provide a process wherein a maximum recovery is made of a good grade of resilient fibers, as well as the process which will ensure the recovery of a maximum amount of juice from the plant.

These juices not only contain chlorophyll concentrates, saponins, but also protein feed products and complete carbohydrates in the residual pulp.

A further object of the invention is to provide an apparatus which is of compact shape which, if desired, may be readily transported into the field when mounted on a suitable truck or trailer, whereby the separate products may be obtained in the field at or near the site of growth of the *Agave lechuguilla* or its kindred species, all known, even though erroneously, under the common name of cactus.

An additional object is to provide a method of treatment of the leaves of the above noted plants by continuously agitating and turning over said leaves while subjecting the same to the action of artificial radiant energy.

Another object is to provide a process which subjects the leaves to the action of pressurized rolls for the purpose of extracting the juices and breaking up the fibrous matter of the said leaves.

An additional object is to provide a method which comprises the use of crusher rolls for crushing the leaves and then kneading the leaves in the production of juices and fibrous products from cactus plants.

Other objects will appear hereinafter throughout the specification.

In the drawings:

FIGURE 1 is a diagrammatic perspective view, partly broken away, of one of the units that can be used in the present process;

FIGURE 2 is a vertical sectional view, partly in full lines, of the leaf treating and crushing apparatus to be used in carrying out the instant process;

FIGURE 3 is a vertical sectional view on the line 3—3 of FIGURE 2;

FIGURE 4 is a vertical sectional view, partly in full lines, of another form of apparatus to be used in the present process; and FIGURE 5 is a side elevational view of the cutting and defiberizing wheel shown in FIGURE 4.

As shown in FIGURE 1, A indicates the plants which are fed by means of a conveyor trough 10 from right to left. This trough preferably is provided with a longitudinal opening at the bottom and between the adjacent lower edges to provide a slot for the accommodation of a rope or chain conveyor indicated by the reference numeral 12. The upper run of the conveyor projects in the slot between the lower inclined edges of the conveyor sides nad engages material so as to move it towards the left end of the conveyor 10. The rope or chain is trained over a pair of pulleys 14 which may be driven from a suitable source of power, not shown. Mounted above the trough is a knife 16, preferably of the guillotine type having cutting edges 18 as guided by the frames 20 which are stationary. The upper portion of the knife 16 is provided with a pivot 22 for pivotally receiving a saddle 24 to which is attached a pitman 26. This latter is pivotally mounted at 28 eccentrically of the disc 30. The disc 30 is keyed to shaft 32 to which pulley 34 is keyed, the whole being driven by a belt 36 or direct connected motor, not shown.

Preferably the conveyor 12 is timed so as to feed plants one at a time toward the cutter in such manner that upon each reciprocation of the knife, the roots will be removed from the rootstock and leaf portions, but this is not usually practicable due to the variable sizes and shapes of the plants that are being fed within the conveyor trough 10. However, it is possible for a workman to regulate by hand the feeding of the individual plants so that upon reciprocation of the knife the roots will be separated from the remainder of the plant.

It has been found that a knife of the guillotine type performs very satisfactorily, although I do not wish to be limited to the specific type of knife used. In particular, a guillotine-type cutter with a knife moving up and down is most effective inasmuch as it is best able to sever the root and rootstock from plants which vary in size, thickness, moisture content and gumminess of the leaves. It will, of course, be possible to use several different types of knives by merely replacing the knife 16 by another knife which is more adaptable for the particular material being treated.

After repeated trials with various types and shapes of knives, it has been found that a heavy steel blade with an inverted V-shaped knife opening gave the best results in cutting the roots from an *Agave lechuguilla* plant regardless of its size. This type of knife was found to have a better slicing action than other types and was more positive in its operation, making a deeper cut than is possible with a straight-edge knife. Moreover, the cutting edges, such as shown at 18, serve to crowd the plant material in the lower end or bottom of the trough during the cutting action. Preferably the edges of the blade are adjusted by means of its frame so that they will wipe against the inclined ends of the conveyor trough.

In a power driven cutting machine, the feeding device, as noted above, consists of a narrow feed belt that may be a rope or chain, and the feed belt may be timed to provide a dwell or stopping point long enough for the knife to cut off the projecting root and rootstock, after which the feed will start up again to repeat the cutting operation with successive plants. With one man and a helper to provide a steady flow of plants to the conveyor or trough 10, it has been found that from 6 to 8 tons of plants may be cut off in an eight-hour day.

After the leaves have been separated from the roots and rootstocks by the mechanism shown in FIGURE 1, they are deposited by gravity on a chute or guide 38 having sides 40 and fixed supports 42. As they move downwardly on the chute, both the roots and rootstocks, together with the leaves, are deposited on the conveyor belt 44. This belt is mounted on pulleys 46 and 48, and it is driven by means of a drive pulley 50 which receives its power from a belt 52, which latter may be driven from a suitable source of power, not shown.

Prior to extracting the juice and pulp from the leaves, the leaves may be subjected to further treatment for removal of adhering dirt and debris by washing or brushing, as well as by the removal of marginal spines. After thorough cleaning, the leaves may be conveyed mechanically, or deposited manually, into the hopper 54, as shown in FIGURE 2, or onto the conveyor belt 44a as shown in FIGURE 4.

The structure shown in FIGURE 2 illustrates the means for processing the plant leaves to extract the juice and other constituents therefrom.

The hopper 54 forms part of the casing 58 in which is located the worm conveyor 60 having bearings 62 in opposite ends of the casing. The worm conveyor is provided with a gear casing 64, the individual gears of which (not shown) are driven by the belt 66 from the motor 68.

The leaves deposited in the hopper 54 are gradually elevated in the casing 58 and while being elevated are preferably subjected to the action of artificial radiant energy, which raises the temperature of the leaves to about 85° C. but not over 120° C., to be described hereinafter. The heat treated leaf materials are deposited by the worm conveyor 60 into a downwardly extending exit opening 70 of casing 58 and onto the crusher rolls 72. After passing through the crusher rolls they are subjected to the action of a juice extractor or pulper having a casing 74. Located within the pulper are the paddles 76 which are mounted on the shaft 78, the shaft being driven by any suitable means, such as an electric motor, not shown. The casing 58 is provided with a screen 80 having a series of perforations. The screen may be elliptical in cross section or shaft 78 may be positioned eccentrically as regards a screen should the same be circular in cross section. Means may be provided for rotating the screen, particularly if the same is circular in cross section, but it is preferred that this screen be in cylindrical form and that it be held rigidly in the casing 58 as shown in FIGURE 2. In any event, the paddles 76 are much closer to the screen at the bottom portion thereof than at the top and sides of the screen. This eccentric mounting results in actually pressing the pulp through the screen as well as throwing it through by centrifugal force. Only the juice goes out through the outlet 84, the fibrous pulp being exhausted through the opening 82 to a cyclone separator or other type separator, not shown.

While the leaves are being subjected to the action of the crusher rolls 72 and to the paddles 76, the said processed leaves can be processed under a blanket of a protective gas.

Container 86 is for the purpose of holding an inert gas, such as carbon dioxide or nitrogen. Sulfur dioxide can also be used to form a protective atmosphere. The amount of inert gas from the container 86 may be regulated by a valve, not shown, by means of the valve handle 88, all of conventional construction, which will permit the entrance of gas by way of pipe 90 from the container 86 to the juice extractor or pulper 74, some of this gas finding its way into the chamber 58. The use of an inert gas excludes air and can cause a more ready extraction of the juice from the leaves.

There has been shown a supporting framework for the pulping mechanism, as indicated at 92. It will be understood that this framework, however, may be mounted on a moving vehicle, such as a truck or trailer, including the casings 58, 70, and 74, and the parts supported thereby, and the conveyor and cutter shown in FIGURE 1.

As the material is elevated from the lower portion of the hopper 54 to the downwardly extending exit opening 70, it is preferably subjected to the action of artificial radiant energy means which has been shown for illustrative purposes as being mounted in a supplemental casing 94 that is attached to casing 58. In this casing 94 are located a plurality of lamps 96, such as infra red lamps, the rays of which may be projected through openings 98 in the casing 58 on to the leaves as they are turned from one side to the other by the rotation of the worm 60, as they are elevated thereby.

As illustrated in FIGURES 4 and 5, which show a different form of processing, the leaves from the *Agave lechuguilla* plants or similar species may be conveyed after their separation from the root material by the apparatus illustrated in FIGURE 1, by means of a conveyor 44a located within the casing 100. While being conveyed, the leaves may also be subjected to the rays from a source of artificial radiant energy located within the casing 102. This casing uses a plurality of infra red lamps 104, the rays of which project through the openings 106 in the casing onto the leaves as they move on the upper run of the belt.

The continuous feeding of the leaves proceeds until they reach the crusher roll casing 108 in which are located the crusher rolls 115 and pressure rolls 110. The crusher rolls, in the form shown in FIGURE 4, separate the fibers and pulpy material from the juice, the latter falling by gravity to the collector pan 112 that is provided with a suitable outlet opening 114 leading to a collector container, not shown.

The crusher rolls 72 of FIGURE 2, and 115 of FIGURE 4, are provided with pyramidal shaped teeth 73 and 111, respectively.

The fibrous materials are carried over by the crusher rolls to the pressure rolls and deposited within the screw conveyor casing 116. It will be noted that the conveyor screw 118 is mounted on a shaft 120 that is driven by a motor 122. The material enters into the blower casing 126, which is of scroll shape, the material entering the eye of the scroll at 124. Fixedly attached to the shaft 120 is the disc 128. The blower casing is provided with a peripheral outlet 132 for exit of the fiber and pulp which has been acted upon by the paddles 130, which latter disintegrate the material.

As seen in FIGURE 5, between the paddles 130 are located knives 134 which act on the pulpy mass so as to cut the same, two knives 134 being shown. Any number of knives may be used that have been found to be efficacious in properly cutting up the fibrous and pulpy materials. However, these knives 134 may be omitted or detached from the disc 128 as desired.

The extraction of juice from the leaf material involves crushing and pressing out most of the original moisture content of the leaves from the *Agave lechuguilla* plants, which averages about 65%, making due allowance for seasonal changes. Under actual conditions, it has been found that the leaf material parts with about 50% or more of its weight in the passage through the crusher rolls, such as shown at 72 in FIGURE 2, or 115 in FIGURE 4, and the pulpy paddles shown at 76 in FIGURE 2 and the cane mill shown at 110 in FIGURE 4. The two methods of extraction, as carried out in the apparatus of this invention, may be described as follows:

Regardless of the method of juice extraction, the crusher rolls are the principal means used to extract a maximum amount of juice from which the saponin and other components may be recovered without materially altering their valuable or characteristic properties. These crusher rolls, as shown in FIGURES 2 and 4, preferably consist of two one-piece rolls with pyramid-shaped teeth about a quarter to 5/16 of an inch deep which serve to break down the hard structure of the leaf and rupture the cells to more readily release the juice while the plant tissues are still fresh and moist. The rolls preferably are of the same size in diameter but are geared to different speeds, thus providing both a crushing and a masticating action on the leaf material. These rolls are selfdraining so that the juice will not collect within them. The crushing of the leaf material by the teeth of the crusher rolls separates the leaf material into two parts, one high in fiber and the other consisting of pulp which contains nearly all of the juice. Both fractions, after emerging from the primary crusher rolls 115 are subjected to pressure in a 3-roll mill 110, as shown in FIGURE 4, which continues the extraction of the juice. One roll surmounts the other two rolls of the secondary roll assembly. These rolls revolve slowly and are provided with grooves between the circumferential rolls to provide free exit of the juice which drops into the collector pan 112 under the rolls and from this point, namely the outlet opening 114 thereof, is run into a holding tank, not shown. The two bottom rolls are rigidly fixed in position, i.e., the rolls and the shaft upon which they are mounted, and the top roll is provided with an automatic adjustable spring so that it may rise and fall with variations in the leaf mass as it enters between the top roll and the two bottom rolls. The mounting of an upper roll whose axis is pressed downwardly by springs, and two bottom rolls with fixed axes, is conventional and has not been further illustrated for this reason.

Numerous tests have shown that with rolls for applying pressure of 150 pounds p.s.i., up to 80% of the available juice in the leaf may be extracted by a single 3-roll mill assembly. A single pair of crusher rolls, such as shown at 115 may be used in advance of the 3-roller mill assembly 110 as shown in FIGURE 4 and as noted above. Preferably, the roller mill 110 and the advance rollers 115 are driven by a directly connected 5 H.P. motor, with an estimated capacity of over one ton of pressed leaf material per hour equaling approximately two tons of leaf material per hour using a 36-inch wide machine.

It will be understood further that I may substitute a helicoidal screw conveyor of the type shown at 60 in FIGURE 2 for the conveyor belt shown at 44a in FIGURE 4, and that this conveyor belt may utilize infra red heat, or such heat may be dispensed with. However, the preferred structure utilizes infra red heat.

The residue from the 3-roller mill 110, shown in FIGURE 4, emerges as a mixture of fiber and pulp in a moist and more or less felted condition which is discharged continuously into the worm feeding mechanism illustrated at 116, 118, and 120, and conveyed to the blower casing 126. Within the blower casing the mixture of fiber and pulp is operated upon by the wheel 128 having cutters 134 and paddles 130 by which the fibrous mass is cut into short lengths and freed from pulp and other extraneous substances adhering to the fibers.

The tooled steel-edged knives with shredder bars or paddles between them attack the fibrous mass as it is continuously fed into the eye of the scroll casing 126. The knife spacing depends on the use to which the fibers are to be put, and this knife spacing determines the fiber length which may be from ½ to 3 inches for most uses.

The malleable fan blades or paddles 130 beat and separate the fiber from the pulp, and the powerful air blast generated by these paddles blows the separated fiber and pulp up the delivery pipe 132 into a cyclone-type collector, not shown, for selective separation. Using a directly connected motor, as shown at 122, which may be 7½ H.P. or more, and assuming the machine is provided with a 36-inch diameter cutting wheel, i.e. the distance from the free ends of the oppositely mounted blades, said wheel is capable of cutting up to 5 tons an hour of expressed leaf material. The cut fiber may serve as a suitable raw material for conversion to semi-chemical pulp, plastic reinforcement, building and/or insulating board, non-woven padding materials, and other uses.

As distinguished from the extractor shown in FIGURE 4, a drum type of extractor may be used, such as shown in FIGURE 2. This extractor has been diagrammatically shown so as to include the parts 74, 76, 78 and 80, and is of a conventional type wherein the shaft with its paddles may be adjusted so as to move the paddles 76 closer or further away from the screen 80. Moreover, the shape of the paddles may be varied in a conventional manner whereby their ends are curved away in opposite directions whereby to draw the material into the pulping chamber and to discharge the fibrous mass forcibly and by the blowing action of the paddles in the direction of the outlet 82, the juice finding its way to the juice outlet 84. In this construction, the paddles are much closer to the screen 80 at the bottom thereof than at the top or sides of the said screen. This construction additionally allows the lumps of fibrous material an opportunity to slip back past the paddles and not be ground up. Due to the eccentric placement of shaft 78 in the screen cylinder 80, i.e. in eccentric relation thereto, the material is kneaded and the juicy stock is forced against the surface of the screen, thus extracting the juice from the pre-crushed leaves as they move toward the discharge opening 82. At the discharge end of the screen assembly an adjustable back pressure may be provided to control the degree of extraction. The extracted juice is collected in a stainless steel or other non-corrosive pan (not shown) from which it is piped at outlet 84 to a holding tank, not shown, while the exhausted spongelike fibrous pulp from the discharge end is conveyed through outlet 82 to the fiber cleaning equipment or other fiber processing equipment, not shown.

The juice is extracted by the use of the drum-type extractor described above by a variable pressure throughout a greater portion of the screen, which pressure increases in intensity until the fibrous pulp is discharged. This pressure, however, is not sufficient to force pulp and/or fiber particles through the perforations of the screen along with the juice. Only juice with relatively few solids passes through the screen to outlet 84.

The capacity of a machine of either form, i.e. of FIGURE 2 or 4, depends upon the operating conditions and the manner of feeding, but either machine will process from 2 to 3 tons per hour of *Agave lechuguilla* leaves or leaves of kindred species to this plant.

It should be emphasized, however, that the important feature of the screw conveyor, whether the same is used in the FIGURE 2 construction or is substituted for the conveyor in the FIGURE 4 construction, is that as the leaves are conveyed along they are continuously turned over whereby both sides of the leaves are subjected to uniform heat treatment. This turning action by the screw conveyor, in combination with the infra red heating, greatly increases the amount and purity of the extracted juice. In other words, the step of continuously turning the leaves from one side to the other while subjecting them to the action of infra red rays prepares the leafy material for the securing of a maximum amount of pure juice from the leaves when operated upon by the crusher rolls and the elliptical pulper mechanism located beneath the rolls. The rotary heating of both sides of the leaves at a temperature of about 85° C. and not exceeding 120° C. substantially increases the capacity of the extractor mechanism, including the crusher rolls and the pulper mechanism located beneath the same.

Various products may be obtained from the *Agave lechuguilla* plant leaves and the leaves of similar plants of this genus when using the present process. The relative amount of juice and fibrous materials that are obtainable can be varied so as to obtain higher or lesser concentrations of juice, and a higher or lower amount of juice in the fibrous material as an end product. Conversely, a larger amount of fiber-free juice may be obtained by adjustment of the pressure rolls and adjustment of the speed of the rotating paddles of FIGURE 2 or FIGURE 4.

It will be noted by comparison of the FIGURE 2 pulper structure that the said structure may be used for pressure impingement and/or kneading. The FIGURE 4 construction discloses the use of pressure only by the use of the rolls 110, 115. Paddles 130 in FIGURE 4 have nothing to do with juice extraction. They act only on the fibrous pulp after the juice has been extracted.

It will be further appreciated that the inert gas step illustrated by the structure shown in FIGURE 2 facilitates the release of the juice from the leaves when operated upon by the crusher rolls 72 and paddles 76.

The cutting and depositing steps as practiced by the machine of FIGURE 1 are intended to be used with the processes that are carried on by either the form shown in FIGURE 2 or FIGURE 4.

It will be understood that the mechanism shown in the several figures may be readily mounted on a truck or trailer which may be moved over the ground so that the process may be practiced by depositing the plants by hand as the machine moves over the ground.

The above description and drawings disclose two embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. The process for the extraction of natural liquid products and pulpy constituents from the undried leaves of the *Agave lechuguilla* plant and kindred species, which comprises separating the roots from the leaves, subjecting the leaves to the action of crusher rolls having teeth of pyramidal shape, discharging the fibers of the crushed leaves and the juices by gravity, to a container, continuously kneading the fibrous mass in said container while depositing additional fibers and juice from the crusher rolls onto said fibrous mass, discharging the juice containing chlorophyll concentrates, saponins and protein feed products from the container by gravity and conveying the separated residual pulp containing carbohydrates through a separate pipe from said container.

2. The method of claim 1, wherein the temperature of the leaves is raised by subjecting the same to artificial radiant energy prior to their subjection to the action of said pressure rolls.

References Cited in the file of this patent

UNITED STATES PATENTS

| | | |
|---|---|---|
| 265,153 | Sanford | Sept. 26, 1882 |
| 308,049 | Barreiras | Nov. 18, 1884 |
| 332,718 | Lafferty | Dec. 22, 1885 |
| 1,460,519 | Wadsworth | July 3, 1923 |
| 1,489,061 | Burdick | Apr. 1, 1924 |
| 1,852,055 | Maxwell | Apr. 5, 1932 |
| 2,021,652 | Halstead | Nov. 19, 1935 |
| 2,121,210 | Nord | June 21, 1938 |
| 2,210,463 | Nord | Aug. 6, 1940 |
| 2,301,787 | Nord | Nov. 10, 1942 |
| 2,452,983 | Birdseye | Nov. 2, 1948 |
| 2,566,943 | King | Sept. 4, 1951 |
| 2,607,688 | Peebles et al. | Aug. 19, 1952 |
| 2,896,267 | Nord | July 28, 1959 |
| 2,897,192 | Nord | July 28, 1959 |

FOREIGN PATENTS

| | | |
|---|---|---|
| 365,378 | Italy | Dec. 2, 1938 |